United States Patent
Rizzello et al.

(10) Patent No.: US 10,539,173 B2
(45) Date of Patent: Jan. 21, 2020

(54) SEALANT CAPS INCLUDING INTERNAL BARRIER RINGS

(71) Applicant: PRC-DeSoto International, Inc., Sylmar (CA)

(72) Inventors: Soccorso Rizzello, Toronto (CA); Sean Lambourne, Calne (GB)

(73) Assignee: PRC-De-Soto International, Inc., Sylmar, CA (US)

( * ) Notice: Subject to any disclaimer, the term of this patent is extended or adjusted under 35 U.S.C. 154(b) by 339 days.

(21) Appl. No.: 14/786,291

(22) PCT Filed: Apr. 22, 2014

(86) PCT No.: PCT/US2014/034906
§ 371 (c)(1),
(2) Date: Oct. 22, 2015

(87) PCT Pub. No.: WO2014/176208
PCT Pub. Date: Oct. 30, 2014

(65) Prior Publication Data
US 2016/0076577 A1 Mar. 17, 2016

Related U.S. Application Data

(60) Provisional application No. 61/814,634, filed on Apr. 22, 2013.

(51) Int. Cl.
*A47G 3/00* (2006.01)
*F16B 37/14* (2006.01)
*F16B 11/00* (2006.01)
*B29C 65/48* (2006.01)
*B29K 101/00* (2006.01)
*B29L 31/00* (2006.01)

(52) U.S. Cl.
CPC ............ *F16B 37/14* (2013.01); *B29C 65/483* (2013.01); *F16B 11/006* (2013.01); *B29K 2101/00* (2013.01); *B29L 2031/712* (2013.01)

(58) Field of Classification Search
CPC ....................................................... F16B 37/14
USPC ............................................................ 411/377
See application file for complete search history.

(56) References Cited

U.S. PATENT DOCUMENTS 2,710,113 A  6/1955  Pritchard
3,470,787 A  10/1969  Mackie
(Continued)

FOREIGN PATENT DOCUMENTS

DE  7238928  1/1973
DE  202004017837 U1  1/2005
(Continued)

*Primary Examiner* — Gary W Estremsky
(74) *Attorney, Agent, or Firm* — Alan G. Towner

(57) ABSTRACT

Sealant cap assemblies comprise a cap shell having an interior volume and a recess adjacent to a bottom opening thereof, a sealant barrier ring at least partially inserted in the recess in the cap shell, and sealant located radially outside the sealant barrier ring adjacent to the bottom opening of the cap shell. The sealant barrier ring may retract into the recess in the cap shell. The sealant may be uncured or partially cured, and is prevented from flowing inside the barrier ring when the sealant cap assemblies are installed on fasteners. Methods of making and using such seal cap assemblies are disclosed. Fasteners sealed by such sealant cap assemblies are also disclosed.

13 Claims, 1 Drawing Sheet

(56) References Cited

U.S. PATENT DOCUMENTS

| | | | |
|---|---|---|---|
| 4,295,766 A | 10/1981 | Shaw | |
| 4,519,974 A * | 5/1985 | Bravenec | B29C 39/10 249/117 |
| 4,826,380 A * | 5/1989 | Henry | B64D 45/02 156/229 |
| 5,175,665 A | 12/1992 | Pegg | |
| 5,308,206 A | 5/1994 | Dorey | |
| 5,755,908 A | 5/1998 | Rayburn | |
| 6,036,804 A | 3/2000 | Rayburn | |
| 7,134,666 B2 | 11/2006 | Beyssac | |
| 7,438,974 B2 * | 10/2008 | Obuhowich | C09K 3/1012 277/316 |
| 7,907,382 B2 | 3/2011 | Martin-Hernandez | |
| 8,388,293 B2 | 3/2013 | Hutter, III | |
| 8,451,577 B2 * | 5/2013 | Bessho | B64D 45/02 361/218 |
| 8,520,358 B2 * | 8/2013 | Bessho | B64D 45/02 361/218 |
| 8,602,764 B2 * | 12/2013 | Hutter, III | F16J 15/00 248/205.3 |
| 8,616,868 B2 * | 12/2013 | Hutter, III | B29C 33/00 156/578 |
| 8,717,736 B2 * | 5/2014 | Asahara | F16B 39/225 361/218 |
| 8,882,423 B2 * | 11/2014 | Watanabe | F16B 37/14 411/337 |
| 9,163,656 B2 * | 10/2015 | Asahara | B64D 45/02 |
| 9,228,604 B2 * | 1/2016 | Dobbin | B64D 45/02 |
| 9,447,808 B2 | 9/2016 | Obuhowich | |
| 9,506,493 B2 | 11/2016 | Dobbin | |
| 9,533,798 B2 * | 1/2017 | Virnelson | B65D 41/005 |
| 9,599,141 B2 * | 3/2017 | Dobbin | B64D 45/02 |
| 9,650,150 B2 * | 5/2017 | Zook | B64D 37/06 |
| 2004/0170487 A1 | 9/2004 | Thompson | |
| 2009/0128983 A1 | 5/2009 | Hernandez | |
| 2009/0147429 A1 | 6/2009 | Martin Hernandez | |
| 2012/0219380 A1 | 8/2012 | Hutter, III | |
| 2014/0312148 A1 | 10/2014 | Blazquez | |
| 2015/0034800 A1 | 2/2015 | Martinez-Martin | |

FOREIGN PATENT DOCUMENTS

| | | |
|---|---|---|
| EP | 0153487 | 9/1985 |
| GB | 2163817 A | 3/1986 |
| JP | S35483077 A | 7/1979 |
| JP | H02138488 A | 5/1990 |
| JP | H05332335 A | 12/1993 |
| WO | WO 2009063063 | 5/2009 |
| WO | 2016129213 A1 | 8/2016 |

* cited by examiner

SEALANT CAPS INCLUDING INTERNAL BARRIER RINGS

CROSS REFERENCE TO RELATED APPLICATIONS

This application claims the benefit of U.S. Provisional Patent Application Ser. No. 61/814,634 filed Apr. 22, 2013, which is incorporated herein by reference.

FIELD OF THE INVENTION

The present invention is related to caps containing sealant materials for sealing mechanical fasteners.

BACKGROUND OF THE INVENTION

Sealants are often used to seal fasteners used in aerospace and other industries. It is known to fill a cap with sealant that is then placed over a fastener to form a seal when the sealant cures.

SUMMARY OF THE INVENTION

An aspect of the invention provides a sealant cap assembly comprising: a cap shell comprising an interior volume, a bottom opening, and a recess adjacent to the bottom opening; a sealant barrier ring at least partially inserted in the recess in the cap shell; and sealant located radially outside the sealant barrier ring adjacent to the bottom opening of the cap shell.

Another aspect of the invention provides a method of making a sealant cap assembly. The method comprises at least partially inserting a sealant barrier ring in a recess located in a bottom opening of a cap shell, and applying sealant adjacent to the bottom opening of the cap shell radially outside the sealant barrier ring.

A further aspect of the invention provides a method of sealing a fastener that has been installed on a substrate. A seal cap assembly is placed over the fastener, and is pressed in an axial direction toward the substrate to thereby cause a barrier ring to at least partially retract into a recess of the seal cap assembly. The sealant flows against the substrate but is substantially prevented from flowing radially inside the barrier ring.

Another aspect of the present invention provides a sealed fastener that has been installed on a substrate. A seal cap assembly covering the fastener is sealingly engaged with the substrate. The seal cap assembly comprises a cap shell having an interior volume and a recess in a bottom opening. A sealant barrier ring is at least partially inserted in the recess in the cap shell, and cured sealant is provided radially outside the sealant barrier ring forming a seal between the bottom opening of the cap shell and the substrate.

DETAILED DESCRIPTION OF EMBODIMENTS OF THE INVENTION

Figure 1:
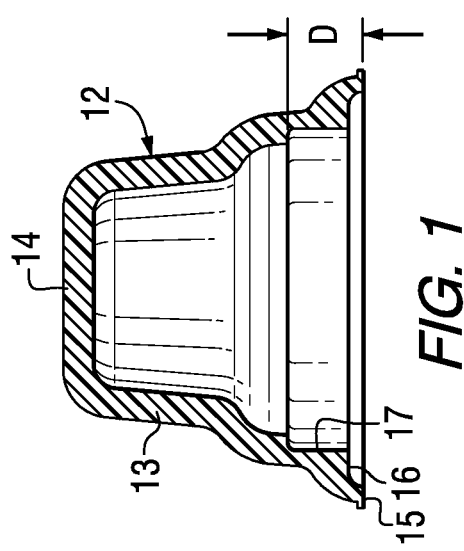
FIG. 1 is a side sectional view of a cap shell for use in a sealant cap assembly in accordance with an embodiment of the present invention.
Figure 2:
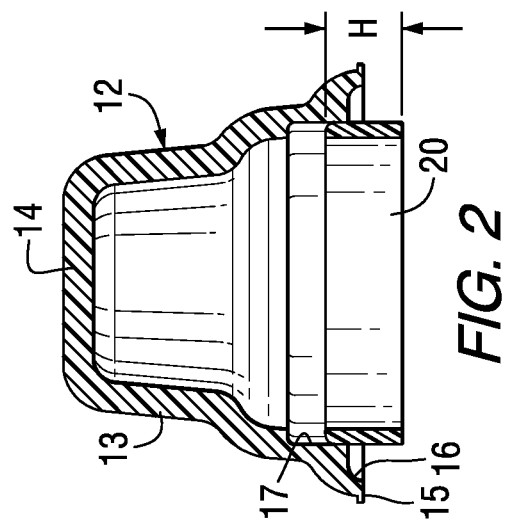
FIG. 2 is a side sectional view of a cap shell and a sealant barrier ring of a sealant cap assembly in accordance with an embodiment of the present invention.
Figure 3:
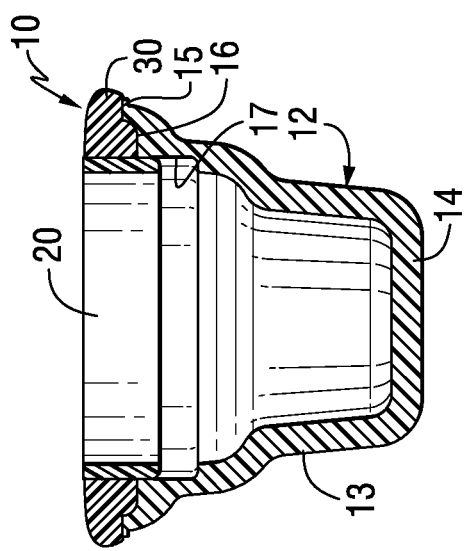
FIG. 3 is a side sectional view of a sealant cap assembly 10 in accordance with accordance an embodiment of the present invention.

FIGS. 1-3 illustrate components of a sealant cap assembly 10 in accordance with an embodiment of the present invention. The sealant cap assembly 10 includes a cap shell 12 having a generally cylindrical or conical sidewall 13, a top 14, and a bottom rim 15. A recessed sealant reservoir 16 is provided near the bottom of the cap shell 12 radially inside the bottom rim 15. An annular recess 17 is provided in the sidewall 13 near the bottom of the cap shell 12. The annular recess 17 has a depth D measured from the bottom rim 15.

As shown most clearly in FIG. 2, a sealant barrier ring 20 is partially inserted into the annular recess 17 of the cap shell 12. The sealant barrier ring 20 has a height H. In certain embodiments, the height H of the barrier ring 20 is less than or equal to the depth D of the annular recess 17 in the cap shell 12. The outside diameter of the sealant barrier ring 20 and the inside diameter of the annular recess 17 are sized to provide a sliding or frictional contact fit between the sealant barrier ring 20 and the annular recess 17. As more fully described below, the sealant barrier ring 20 can move axially with respect to the cap shell 12, allowing the ring 20 to be retracted into the annular recess 17.

As shown most clearly in FIG. 3, an uncured sealant 30 may be applied to the sealant cap assembly 10 by filling the recessed sealant reservoir 16 around the outside diameter of the sealant barrier ring 20. In FIG. 3, the cap shell 12 has been inverted from the position shown in FIGS. 1 and 2, and the uncured recessed sealant reservoir 16 is filled with the uncured sealant 30. The barrier ring 20 prevents the sealant 30 from flowing radially inward from the reservoir 16. In the embodiment shown in FIG. 3, the sealant 30 is applied to the assembly 10 to a level where the sealant 30 is substantially flush with the edge of the barrier ring 20.

Figure 4:
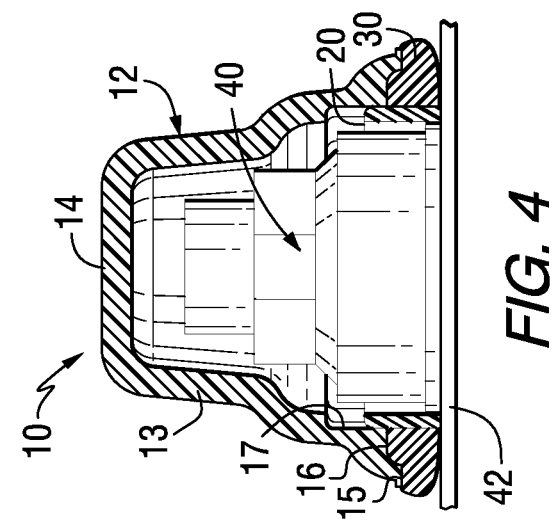
FIG. 4 is a side sectional view illustrating placement of a sealant cap assembly 10 over a fastener in accordance with an embodiment of the present invention.
Figure 5:
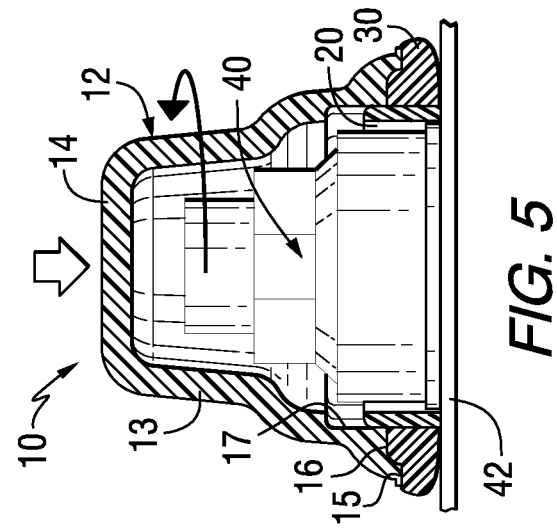
FIG. 5 is a side sectional view illustrating manipulation of a sealant cap assembly 10 in relation to a fastener during a sealing operation in accordance with an embodiment of the present invention.
Figure 6:
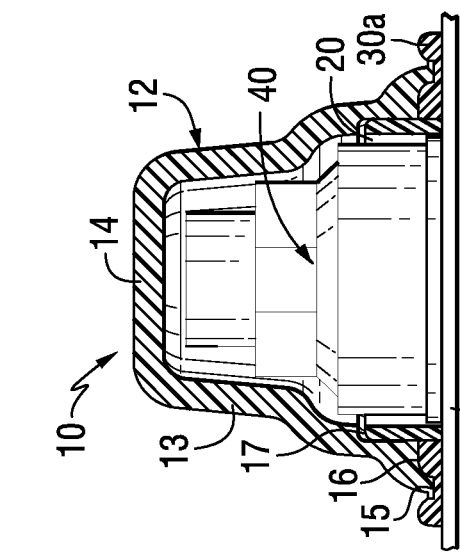
FIG. 6 is side sectional view of a sealant cap assembly 10 installed in a sealing arrangement around a fastener in accordance with an embodiment of the present invention.

FIGS. 4-6 illustrate the installation of a sealant cap assembly 10 around a fastener 40 installed on a substrate in accordance with an embodiment of the present invention. As shown in FIG. 4, the sealant cap assembly 10 is positioned over the fastener 40 with the lower edge of the sealant barrier ring 20 contacting the substrate 42. In the position shown in FIG. 4, the sealant 30 may contact, or come close to contacting, the upper surface of the substrate 42. In the position shown in FIG. 4, the barrier ring 20 extends from the annular recess 17 of the seal cap 12 a distance that is approximately 50 percent of the depth D of the annular recess 17. However, in certain embodiments, the extension distance may be from 10 to 90 percent, or from 20 to 80 percent, or from 30 to 70 percent, or from 40 to 60 percent.

As shown in FIG. 5, the sealant cap assembly 10 may be pressed downward and rotated, as shown by the arrows. Such downward movement causes the sealant cap assembly 10 to move to a position as shown in FIG. 6, in which the bottom rim 15 of the cap shell 12 is moved closer to the upper surface of the substrate 42, thereby causing the sealant to flow and deform 30a. During the installation, the sealant barrier ring 20 slides axially and is retracted at least partially into the annular recess 17 of the cap shell 12. The sealant barrier ring 20 provides at least a partial barrier against flow of the sealant 30a radially inward. Thus, the barrier ring 20 substantially prevents the sealant 30 from flowing into the interior of the barrier ring 20 or the cap shell 12, i.e., the sealant 30 remains in contact with a portion of the outer diameter of the barrier ring 20, and does not fill the cavity inside the cap shell 12. The interior cavity of the cap shell 12 may therefore remain void of the sealant 30. Upon curing, the sealant 30a forms a seal between the cap shell 12 and the surface of the substrate 42.

The shell cap 12 may be made of any suitable material, including a second quantity of sealant that is at least partially hardened, plastics including hydrophobic polymers, and the like. In certain embodiments, the shell and the sealant comprise the same composition. The cap shell 12 can be formed by any means known in the art, for example by using an injection-filled mold, stamping, using male and female molds, and the like, carried out at atmospheric, sub-atmospheric, or super-atmospheric pressures. One skilled in the art knows various methods of forming concave shells into a variety of shapes and sizes to fit a particular application. Example methods of forming the shells are identified in U.S. Pat. No. 7,438,974, incorporated herein by reference.

The barrier ring 20 may be made of plastic or any other suitable material. The barrier ring 20 may float freely on the inside diameter of the cap, and initially protrudes out from the base of the cap. A function of the ring is to act as a barrier that prevents sealant from making its way to the interior cavity. A groove or other surface feature (not shown) may optionally be provided at the bottom rim 15 of the cap shell 12 in order to increase bonding surface area. In certain embodiments, the ring may be made of polyether imide (PEI) or any other suitable polymeric material.

As used herein, the term "sealant" refers to a composition that, when applied to an aperture (such as the joint or space formed by the interface between two parts), has the ability to resist atmospheric conditions, such as moisture and temperature, and at least partially block the transmission of materials, such as water, fuel and/or other liquids and gasses, which might otherwise occur at the aperture. Sealants, therefore, are often applied to a peripheral edge surface of a component part for the purpose of hindering material transport to or from such a part. Sealants often have adhesive properties. The present sealants may also include known types of adhesives.

The term "at least partially unhardened" is meant to include the entire range of hardness from completely liquid to somewhat gelled at least to the point that the sealant/adhesive can conform to the surface of the substrate. Conversely, the term "at least partially hardened" is meant to include the entire range of hardness from completely cured to somewhat gelled at least to the point that the sealant can be manually or mechanically handled for application to the substrate. Therefore, it is contemplated that portions of the sealant can be hardened or unhardened such that the sealant is not uniform throughout the quantity of the sealant. For example, sealant does not have to harden at the same time, and can leave the potential for pockets of unhardened sealant in almost completely cured sealant and hardened sealant in almost completely uncured sealant.

The hardening or curing time for sealant depends on the pot life of the sealant composition and can vary widely ranging from minutes to hours. In another non-limiting embodiment, the sealant may be thermally regulated to keep it from becoming completely cured prior to installation over the fastener. The term "thermally regulating" refers to decreasing and/or maintaining the sealant at temperatures that retard hardening by at least partially suspending the curing process. Temperature can be decreased to effectively suspend the curing process. In one non-limiting embodiment, the length of time for the curing process to reach completion can correlate inversely with temperature, such that the lower the temperature the greater the suspension in the curing process and rate of retardation of hardening. In one non-limiting embodiment, the decrease and/or maintenance of the temperature can last from the point in time when the sealant is made and positioned in the cavity of the shell to the point when the sealant is ready for application to the substrate. Hence, cooling may be used during storage and transport of the sealant, such as shipping the assembly 10 and its sealant 30 under refrigerated conditions or in dry ice.

The temperature to suspend the curing process referred above can vary widely and depends on the shelf life of the sealant. The date of expiration for sealant relative to temperature varies from sealant composition to sealant composition. In one non-limiting example, the shelf life of a sealant can be 21 days at −40° C. The shelf life can be extended by lowering the temperature. In one non-limiting embodiment, the sealant can be kept at temperatures between and including −100° C. to −25° C. to retard hardening. In another non-limiting embodiment, the sealant can be kept at a maximum temperature of −75° C. In another non-limiting embodiment, the sealant can be kept at a minimum temperature of −55° C. In another non-limiting embodiment, the sealant can be kept at −45° C. The choice of sealant is not critical and a variety of materials known in the art can be used.

The particular choice of sealant generally depends on a number of factors such as the type of substrate and intended end use. Non-limiting examples of commercially available sealants include PR-1776®, PS-890® and PR-1440® from PRC DeSoto International, Inc. (Burbank, Calif.) and AC-236® and AC-250® from AC Tech (PBT Brands, Inc., Hartford Conn.). In addition, this method of preformed at least partially unhardened material can be used for other compositions such as adhesives, coatings, etc.

In the non-limiting embodiments listed above, the sealant can be cured or hardened by the addition of heat. In another non-limiting embodiment, the sealant can be cured or hardened by oxidation. In this embodiment, the oxidation of the sealant can be retarded by limiting the sealant's exposure to air such that the sealant remains partially unhardened.

The term "inhibiting" refers to restraining, impeding, slowing or interfering with a particular reaction or function. This can be accomplished in a number of ways, for example, controlling the environment to which the sealant is exposed. In the case of oxidation, inhibiting refers to restraining, impeding, slowing or interfering with the oxidation of the sealant. In a non-limiting example, oxidation is at least partially inhibited by limiting the sealant's exposure to air or ambient conditions. In the case of the moisture, inhibiting refers to restraining, impeding, slowing or interfering with the development of moisture on the sealant. A non-limiting example comprises at least partially inhibiting moisture by limiting the condensation on the sealant surface.

For purposes of this detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. A sealant cap assembly comprising:
   a cap shell comprising an interior volume, a closed top, a bottom opening, a bottom rim and a recessed sealant reservoir adjacent to the bottom opening;
   a sealant barrier ring at least partially inserted in the recessed sealant reservoir in the cap shell having an upper edge below the closed top of the cap shell, wherein the recessed sealant reservoir is located radially inside the bottom rim and radially outside the sealant barrier ring, and wherein the sealant barrier ring slidably contacts an annular recess of the cap shell, is partially inserted in the recessed sealant reservoir of the cap shell and extends downward past the bottom rim of the cap shell; and
   sealant located radially outside the sealant barrier ring adjacent to the bottom opening of the cap shell.

2. The sealant cap assembly of claim 1, wherein the sealant barrier ring is axially movable in the recessed sealant reservoir in the cap shell.

3. The sealant cap assembly of claim 2, wherein the sealant barrier ring comprises a substantially cylindrical outer diameter, and the annular recess of the cap shell comprises a substantially cylindrical inner diameter.

4. The sealant cap assembly of claim 3, wherein the sealant barrier ring has a height H, the annular recess of the cap shell has a depth D measured from the bottom rim of the cap shell, and the height H is less than or equal to the depth D.

5. The sealant cap assembly of claim 1, wherein the sealant fills the entire recessed sealant reservoir.

6. The sealant cap assembly of claim 1, wherein the sealant is overfilled in the recessed sealant reservoir.

7. The sealant cap assembly of claim 1, wherein the sealant is at least partially unhardened.

8. The sealant cap assembly of claim 7, wherein the sealant is at a temperature that retards hardening of the sealant.

9. A method of making a sealant cap assembly comprising:
   at least partially inserting a sealant barrier ring in a recess located in a bottom opening of a cap shell, wherein the cap shell comprises an interior volume, a closed top, a bottom opening, a bottom rim and a recessed sealant reservoir located radially inside the bottom rim and radially outside the sealant barrier ring, and wherein the sealant barrier ring slidably contacts an annular recess of the cap shell, has an upper edge located within the interior volume of the cap shell and extends axially beyond the bottom rim of the cap shell; and
   applying sealant adjacent to the bottom opening of the cap shell radially outside the sealant barrier ring, wherein the sealant is filled to a level substantially flush with an end of the sealant barrier ring extending axially beyond the bottom rim of the cap shell.

10. The method of claim 9, wherein the recessed sealant reservoir is entirely filled with the sealant.

11. The method of claim 9, wherein the recessed sealant reservoir is overfilled with the sealant.

12. A method of sealing a fastener that has been installed on a substrate, the method comprising:
   placing a seal cap assembly over the fastener, wherein the seal cap assembly comprises:
      a cap shell comprising an interior volume, a closed top, a bottom opening, a bottom rim and a recessed sealant reservoir adjacent to the bottom opening;
      a sealant barrier ring at least partially inserted in the recessed sealant reservoir in the cap shell having an upper edge below the closed top of the cap shell, wherein the recessed sealant reservoir is located radially inside the bottom rim and radially outside the sealant barrier ring, and wherein the sealant barrier ring slidably contacts an annular recess of the cap shell is partially inserted in the recessed sealant reservoir of the cap shell and extends downward past the bottom rim of the cap shell; and
      sealant located radially outside the sealant barrier ring adjacent to the bottom opening of the cap shell;
   pressing the seal cap assembly in an axial direction toward the substrate to thereby cause the barrier ring to at least partially retract into the recess of the cap shell, and to cause the sealant to flow against the substrate while substantially preventing flow of the sealant radially inside of the barrier ring;
   rotating the cap shell around the axial direction; and
   curing the sealant to thereby form a seal between the cap shell and the substrate.

13. The method of claim 12, wherein the cap shell is rotated at the same time it is axially pressed toward the substrate.

* * * * *